(12) United States Patent
Okamoto et al.

(10) Patent No.: US 12,340,731 B2
(45) Date of Patent: Jun. 24, 2025

(54) DRIVE CONTROL DEVICE, DRIVE CONTROL METHOD, INFORMATION PROCESSING SYSTEM, AND INFORMATION PROCESSING METHOD FOR INFORMATION PROCESSING SYSTEM

(71) Applicant: Sony Group Corporation, Tokyo (JP)

(72) Inventors: Eizo Okamoto, Kanagawa (JP); Hideki Date, Kanagawa (JP)

(73) Assignee: Sony Group Corporation (JP)

( * ) Notice: Subject to any disclaimer, the term of this patent is extended or adjusted under 35 U.S.C. 154(b) by 0 days.

(21) Appl. No.: 18/287,228

(22) PCT Filed: Feb. 1, 2022

(86) PCT No.: PCT/JP2022/003725
§ 371 (c)(1),
(2) Date: Oct. 17, 2023

(87) PCT Pub. No.: WO2022/230277
PCT Pub. Date: Nov. 3, 2022

(65) Prior Publication Data
US 2024/0203322 A1    Jun. 20, 2024

(30) Foreign Application Priority Data
Apr. 30, 2021 (JP) ................... 2021-077236

(51) Int. Cl.
*G09G 3/32* (2016.01)
(52) U.S. Cl.
CPC ........... *G09G 3/32* (2013.01); *G09G 2300/06* (2013.01); *G09G 2320/0233* (2013.01); *G09G 2360/141* (2013.01)

(58) Field of Classification Search
CPC ............... G09G 3/32; G09G 2300/06; G09G 2300/026; G09G 2320/0233;
(Continued)

(56) References Cited

U.S. PATENT DOCUMENTS

2006/0209006 A1\* 9/2006 Eckhardt .............. G09G 3/3406
345/102
2010/0321410 A1\* 12/2010 Jenks ..................... G09G 5/005
345/676

(Continued)

FOREIGN PATENT DOCUMENTS

JP  2020502561 A  1/2020
JP  2020183998 A  11/2020
WO WO-2018164105 A1  9/2018

OTHER PUBLICATIONS

International Search Report for Application No. PCT/JP2022/003725 mailed Apr. 12, 2022, pp. 1-3.

*Primary Examiner* — Stephen G Sherman
(74) *Attorney, Agent, or Firm* — Lerner David LLP

(57) ABSTRACT

The present disclosure relates to a drive control device, a drive control method, an information processing system, and an information processing method for an information processing system capable of suppressing the occurrence of banding that occurs in a direct view light emitting diode (LED) display during re-imaging.
In order to make luminance of the LEDs lower, lower-order bits used for control using thinned light emission are fixed at 0 to disable the control using thinned light emission, and light emission is controlled for each plurality of LEDs set as a unit using pseudo gradation for gradation control by controlling the number of LEDs that emit light and the positions of the LEDs that emit light. The present disclosure is applicable to a passive-matrix driven LED display device.

15 Claims, 13 Drawing Sheets

(58) Field of Classification Search
CPC .......... G09G 2360/141; G09G 3/1446; G09G 3/3216; G09G 2310/0213
See application file for complete search history.

(56) References Cited

U.S. PATENT DOCUMENTS

| | | |
|---|---|---|
| 2018/0137820 A1* | 5/2018 | Ota .................... G09G 3/3266 |
| 2020/0279540 A1* | 9/2020 | Wang .................. H01L 29/786 |
| 2021/0056885 A1 | 2/2021 | Park et al. |
| 2021/0295766 A1 | 9/2021 | Sugiyama |

* cited by examiner

DRIVE CONTROL DEVICE, DRIVE CONTROL METHOD, INFORMATION PROCESSING SYSTEM, AND INFORMATION PROCESSING METHOD FOR INFORMATION PROCESSING SYSTEM

CROSS-REFERENCE TO RELATED APPLICATIONS

This application is a national phase entry under 35 U.S.C. § 371 of International Application No. PCT/JP2022/003725 filed Feb. 1, 2022, which claims the priority from Japanese Patent Application No. 2021-077236 filed in the Japanese Patent Office on Apr. 30, 2021, the entire contents of which are hereby incorporated by reference.

TECHNICAL FIELD

The present disclosure relates to a drive control device, a drive control method, an information processing system, and an information processing method for an information processing system, and more particularly, to a drive control device, a drive control method, an information processing system, and an information processing method for an information processing system capable of suppressing the occurrence of banding that occurs in a direct view light emitting diode (LED) display during re-imaging.

BACKGROUND ART

A market for direct view displays using light emitting diodes (LEDs) has been recently growing.

Here, proposed for an LED display using a general-purpose driver integrated circuit (IC) is a technology in which, in a case where gradations are controlled by repeating light emission and extinction in a time direction at a rate that cannot be visually recognized by human eyes, low gradations are expressed by thinning out light emission (see Patent Document 1).

CITATION LIST

Patent Document

Patent Document 1: Japanese Patent Application Laid-Open No. 2020-183998

SUMMARY OF THE INVENTION

Problems to be Solved by the Invention

Meanwhile, among direct view displays, a large tiling panel is used in a television program backyard or a virtual studio for film shooting, and for example, so-called re-imaging, in which an image displayed on a display is captured, is frequently performed.

It is, however, known that banding occurs in a case where an image displayed on a passive-matrix driven LED display that dominates the market is captured by an imaging device such as a camera.

This is because with the technology disclosed in Patent Document 1 described above applied, low luminance gradations are expressed by changing a light emission duty.

That is, low luminance gradations are expressed on a display by the control of the light emission duty, so that, for a specific line of an imaging element that captures an image of the display, for example, a period during which the imaging element cannot be exposed, such as a data write period, and a light emission period of the display may overlap.

In this case, the specific line becomes shorter in exposure time than the other lines, so that the specific line is imaged darkly and thus appears dark as compared with the other lines, which is recognized as dark and light stripes, that is, banding.

The present disclosure has been made in view of such circumstances, and in particular, it is an object of the present disclosure to allow suppression of the occurrence of banding that occurs in a direct view light emitting diode (LED) display during re-imaging.

Solutions to Problems

A drive control device according to a first aspect of the present disclosure includes a light emission control unit configured to control light emission of light emitting diodes (LEDs) constituting an LED array, in which the light emission control unit performs light emission control for each plurality of the LEDs set as a unit to express some gradations of luminance of the LEDs.

A drive control method according to the first aspect of the present disclosure includes a step of controlling light emission of light emitting diodes (LEDs) constituting an LED array, in which in a process of the step, light emission control is performed for each plurality of the LEDs set as a unit to express some gradations of luminance of the LEDs.

In the first aspect of the present disclosure, the light emission of the light emitting diodes (LEDs) constituting the LED array is controlled for each plurality of the LEDs set as a unit to express some gradations of luminance of the LEDs.

An information processing system according to a second aspect of the present disclosure includes: a display including display units, each of the display units including light emitting diodes (LEDs) arranged in an array and a drive control device configured to control driving of the LEDs; and a distributor configured to receive input of a video signal, perform predetermined signal processing on the video signal, and distribute the video signal among the display units, in which the drive control device includes a light emission control unit configured to control light emission of the LEDs, and the light emission control unit performs light emission control for each plurality of the LEDs set as a unit to express some gradations of luminance of the LEDs.

An information processing method for an information processing system according to the second aspect of the present disclosure, the information processing system including: a display including display units, each of the display units including light emitting diodes (LEDs) arranged in an array and a drive control device configured to control driving of the LEDs; and a distributor configured to receive input of a video signal, perform predetermined signal processing on the video signal, and distribute the video signal among the display units, the information processing method includes a step of controlling light emission of the LEDs by the drive control device, in which in a process of the step, light emission control is performed for each plurality of the LEDs set as a unit to express some gradations of luminance of the LEDs.

In the second aspect of the present disclosure, provided are the display including the display units, each of the display units including the light emitting diodes (LEDs) arranged in an array and the drive control device configured to control driving of the LEDs, and the distributor configured to receive input of the video signal, perform the predetermined signal processing on the video signal, and distribute the video signal among the display units, and the light emission of the LEDs is controlled by the drive control device, and the light emission control is performed for each plurality of the LEDs set as a unit to express some gradations of luminance of the LEDs.

MODE FOR CARRYING OUT THE INVENTION

Figure 1:
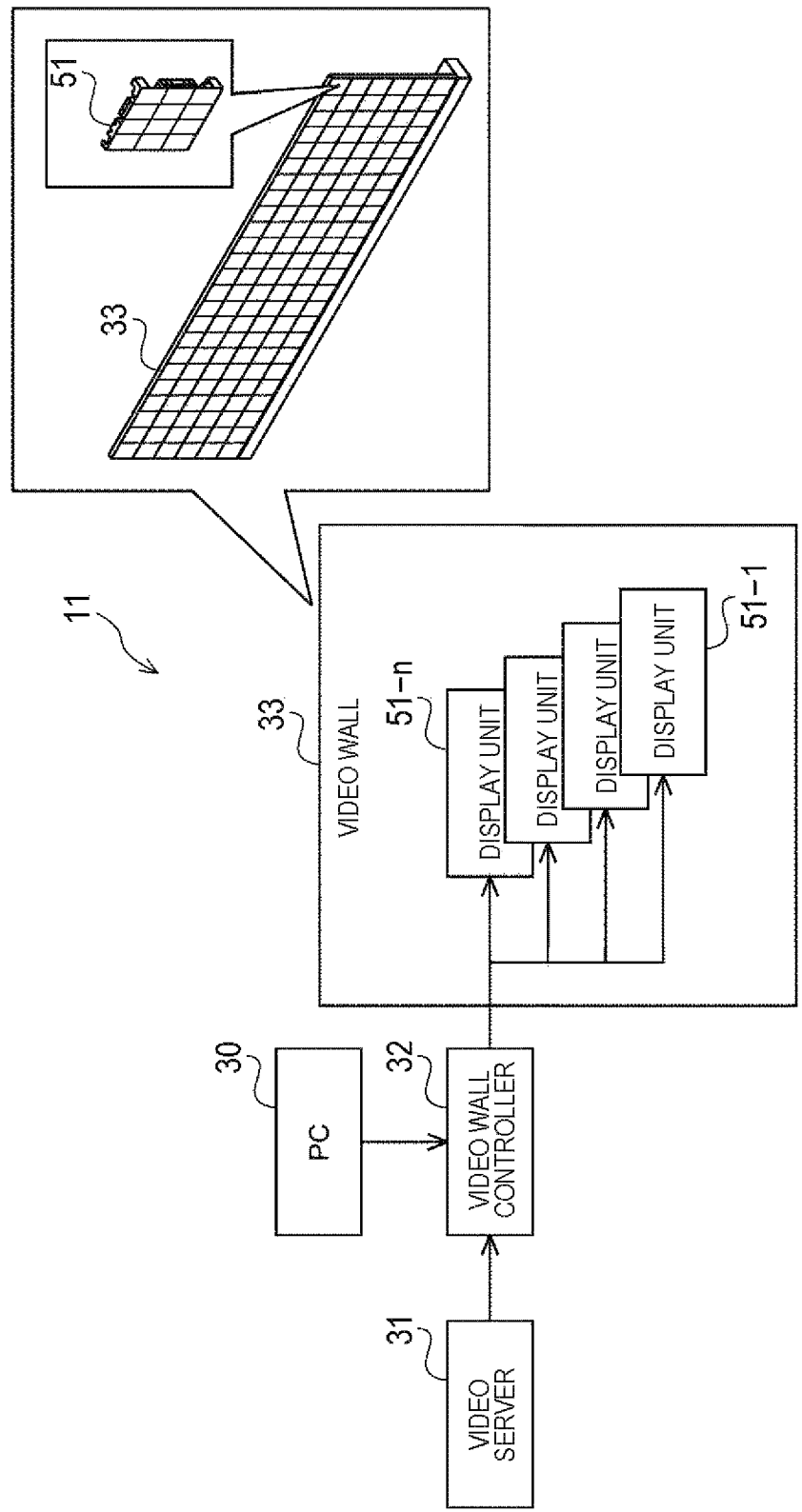
FIG. 1 is a diagram describing a configuration example of a display system of the present disclosure.

Hereinafter, a preferred embodiment of the present disclosure will be described in detail with reference to the accompanying drawings. Note that, in present specification and drawings, components having substantially the same functional configuration are denoted by the same reference numerals to avoid the description from being redundant.

Hereinafter, modes for carrying out the present technology will be described. The description will be given in the following order.

1. Configuration Example of Display System
2. Detailed Configuration of Video Wall Controller and Display Unit
3. Configuration Example of LED Array
4. Gradation Expression Using Thinned Light Emission
5. Global Shutter and Rolling Shutter
6. Cause of Banding
7. Gradation Expression of Present Disclosure
8. Example of Pseudo Gradation
9. Display Processing
10. Driver Control Processing by Display Unit
11. Video Signal Processing 1. Configuration Example of Display System In particular, the present disclosure is intended to suppress the occurrence of banding that occurs in a direct view light emitting diode (LED) during re-imaging.

FIG. 1 depicts a configuration example of a display system to which the technology of the present disclosure is applied.

A display system 11 in FIG. 1 is configured to display video content on a large display including a plurality of display units arranged in a tiled layout.

More specifically, the display system 11 includes a personal computer (PC) 30, a video server 31, a video wall controller 32, and a video wall 33.

The personal computer (PC) 30 is a general-purpose computer, and the PC 30 receives the input of user operation and supplies a command corresponding to a detail of the operation to the video wall controller 32.

The video server 31 includes, for example, a server computer or the like, and supplies data of a video signal such as video content to the video wall controller 32.

The video wall controller 32 operates in response to the command supplied from the PC 30, and distributes the data of the video signal of the video content among display units 51-1 to 51-$n$ constituting the video wall 33 to cause the display units 51-1 to 51-$n$ to display the data.

Note that, in a case where it is not necessary to distinguish the display units 51-1 to 51-$n$, the display units are simply referred to as a display unit 51.

As depicted in the upper right part of FIG. 1, the video wall 33 corresponds to the display units 51-1 to 51-$n$ arranged in a tiled layout, the display units 51-1 to 51-$n$ each having pixels including LEDs arranged in an array, and images individually displayed by the display units 51 are combined in a tiled layout, so that one entire image is displayed on the video wall 33.

The video wall controller 32 performs predetermined signal processing on the data of the video signal of the video content supplied from the video server 31, distributively supplies the data in accordance with the arrangement of the display units 51-1 to 51-$n$, controls their respective displays of the display units 51-1 to 51-$n$, and controls the video wall 33 to display one entire image.

Note that the video wall controller 32 and the video wall 33 may be integrated with each other, or may be integrated into a display device (information processing system).

2. Detailed Configuration of Video Wall Controller and Display Unit

Next, a detailed configuration example of the video wall controller 32 and the display unit 51 will be described with reference to FIG. 2.

The video wall controller 32 includes a local area network (LAN) terminal 71, a high definition multimedia interface (HDMI) (registered trademark) terminal 72, a display port (DP) terminal 73, a digital visual interface (DVI) terminal 74, a network interface (IF) 75, a micro processor unit (MPU) 76, a signal input IF 77, a signal processing unit 78, a dynamic random access memory (DRAM) 79, a signal distribution unit 80, and output IFs 81-1 to 81-$n$.

The local area network (LAN) terminal 71 is, for example, a connection terminal of a LAN cable or the like, and the LAN terminal 71 establishes communication with the personal computer (PC) 30 over a LAN, the personal computer (PC) 30 being operated by the user to supply a control command or the like corresponding to a detail of the operation to the video wall controller 32, and supplies the input control command or the like to the MPU 76 via the network IF 75.

Note that the LAN terminal 71 may have a configuration adapted to physical connection with a wired LAN cable, or may have a configuration adapted to connection with a so-called wireless LAN implemented by wireless communication.

The MPU 76 receives the input of the control command supplied from the PC 30 via the LAN terminal 71 and the network IF 75, and supplies a control signal corresponding to the received control command to the signal processing unit 78.

The HDMI terminal 72, the DP terminal 73, and the DVI terminal 74 each serve as an input terminal of the data of the video signal, and is connected to, for example, the server computer functioning as the video server 31, and supplies the data of the video signal to the signal processing unit 78 via the signal input IF 77.

Figure 2:
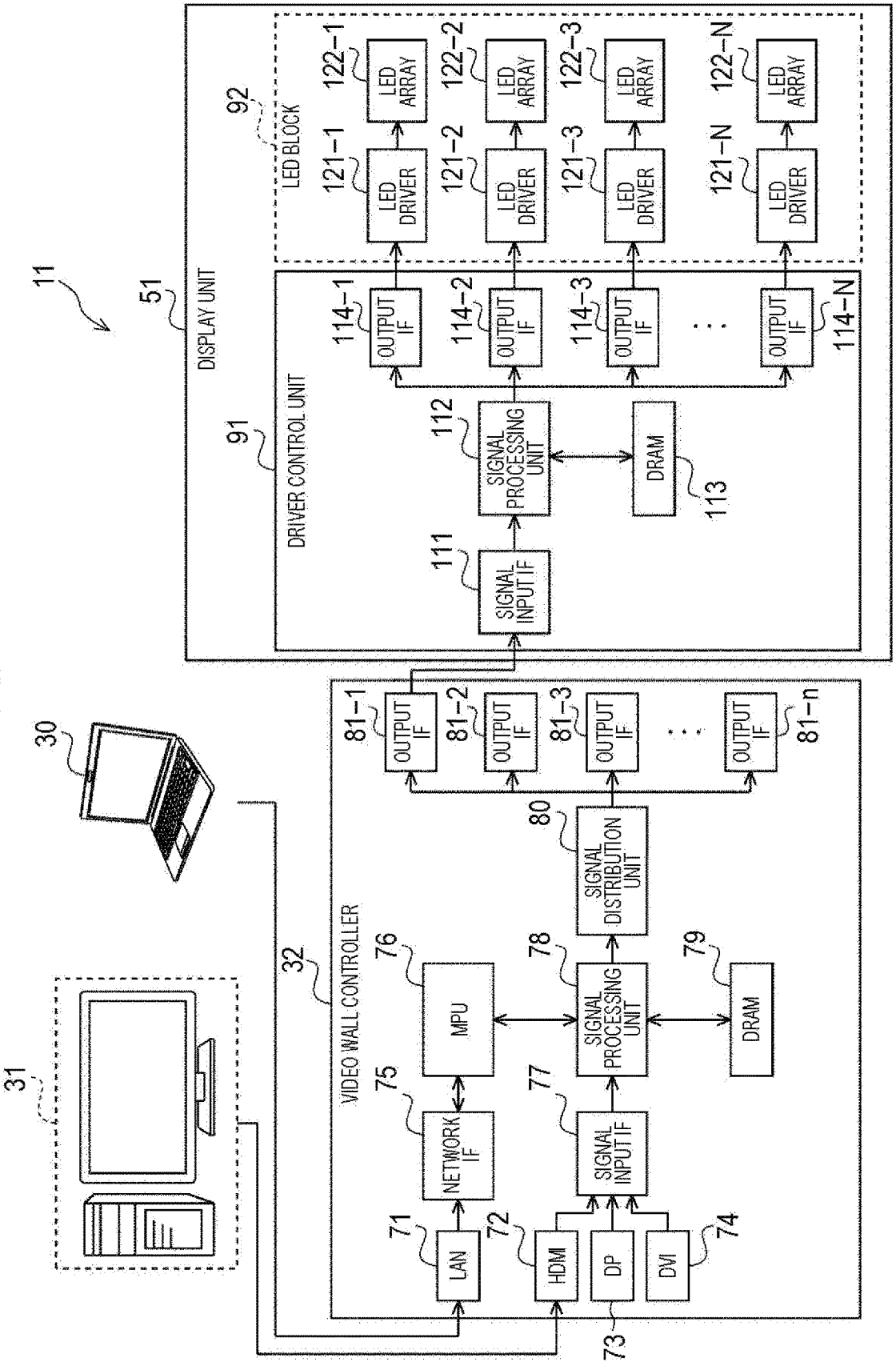
FIG. 2 is a diagram describing a configuration example of a video wall controller and a display unit in FIG. 1.

Note that, although FIG. 2 depicts an example where the video server 31 and the HDMI terminal 72 are connected, any one of the HDMI terminal 72, the DP terminal 73, or the DVI terminal 74 may be selected and connected as necessary because the HDMI terminal 72, the DP terminal 73, and the DVI terminal 74 have different standards but basically have similar functions.

The signal processing unit 78 adjusts color temperature, contrast, brightness, and the like of the data of the video signal supplied via the signal input IF 77 on the basis of the control signal supplied from the MPU 76, and supplies the data to the signal distribution unit 80. At this time, the signal processing unit 78 develops the data of the video signal in the connected DRAM 79, performs signal processing based on the control signal, and supplies a result of the signal processing to the signal distribution unit 80 as necessary.

The signal distribution unit 80 distributes the data of the video signal subjected to the signal processing and supplied from the signal processing unit 78 and distributively transmits the data to the display units 51-1 to 51-n via the output IFs 81-1 to 81-n.

The display unit 51 includes a driver control unit 91 and an LED block 92.

The driver control unit 91 supplies the data of the video signal for controlling light emission of LEDs constituting LED arrays 122-1 to 122-N to a plurality of LED drivers 121-1 to 121-N constituting the LED block 92.

More specifically, the driver control unit 91 includes a signal input IF 111, a signal processing unit 112, a DRAM 113, and output IFs 114-1 to 114-N.

The signal input IF 111 receives the input of the data of the video signal supplied from the video wall controller 32 and supplies the data to the signal processing unit 112.

The signal processing unit 112 corrects color and luminance for each display unit 51 on the basis of the data of the video signal supplied from the signal input IF 111, generates data for setting light emission intensity of each LED constituting the LED arrays 122-1 to 122-N, and distributively supplies the data to the LED drivers 121-1 to 121-N of the LED block 92 via the output IFs 114-1 to 114-N.

The LED block 92 includes the LED drivers 121-1 to 121-N and the LED arrays 122-1 to 122-N.

The LED drivers 121-1 to 121-N each perform pulse width modulation (PWM) control on the light emission of the LEDs arranged in an array constituting a corresponding one of the LED arrays 122-1 to 122-N on the basis of the data for setting the light emission intensity of the LEDs 141, the data containing the video signal supplied from the driver control unit 91.

3. Configuration Example of LED Array

Figure 3:
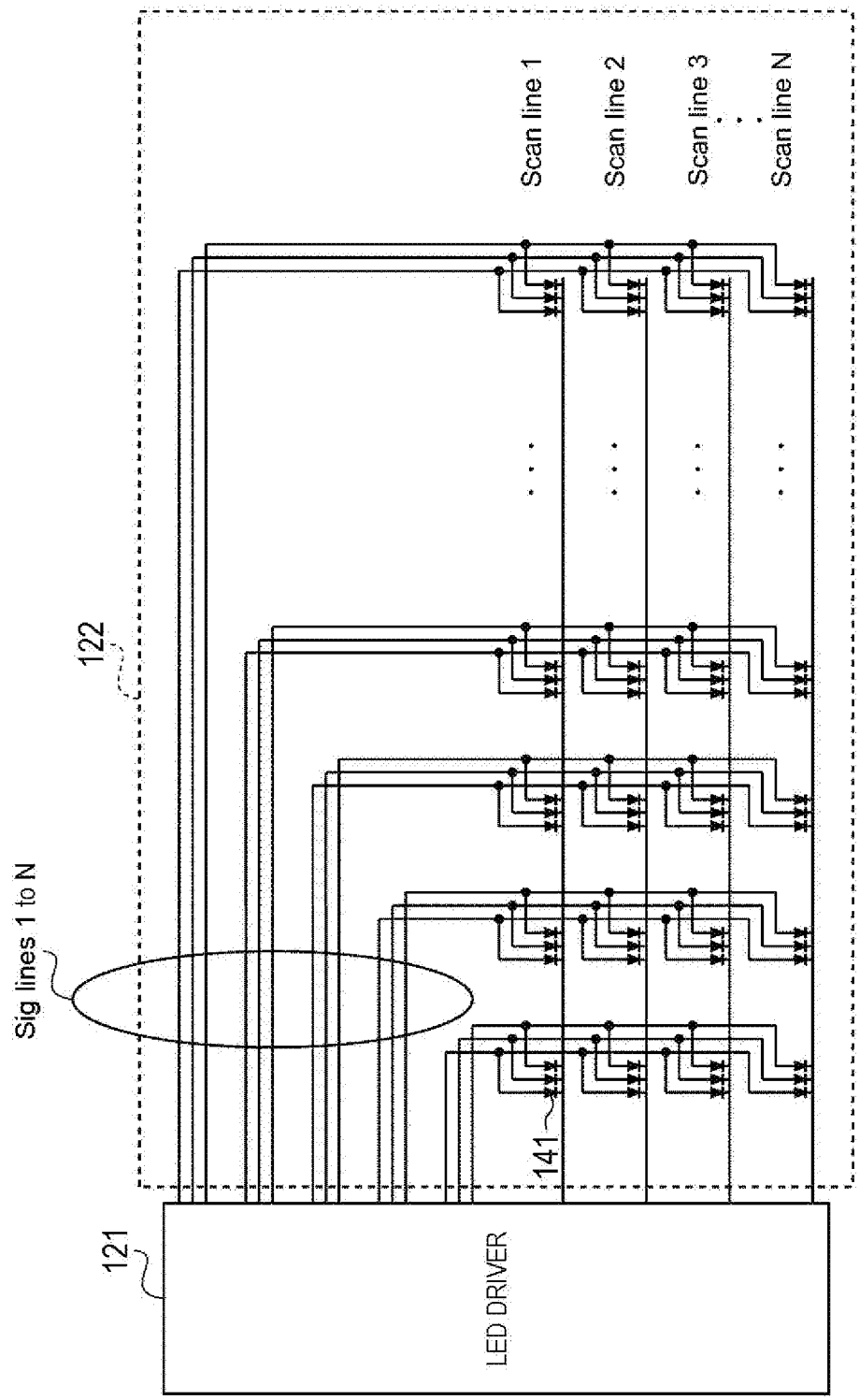
FIG. 3 is a diagram describing a configuration example of an LED array.

Next, a configuration example of the LED array 122 will be described with reference to FIG. 3. FIG. 3 depicts a configuration example of the LED array 122 with LED drive connections of a passive-matrix drive type. Therefore, the light emission of the LEDs 141 of the LED array 122 is controlled under a passive-matrix drive scheme.

In the LED array 122 in FIG. 3, the LEDs 141 of a common cathode type are arranged in an array and are each connected to a Sig line (luminance control wiring) laid in a vertical direction and a Scan line (row selection wiring) laid in a horizontal direction.

In the LED array 122 in FIG. 3, when a Scan line 1 is set at a predetermined fixed potential to become ON, a current is supplied to the LEDs through the Sig line to bring the LEDs into a light emission operation. Note that the predetermined fixed potential is typically, but not limited to, GND=0 V potential.

4. Gradation Expression Using Thinned Light Emission

In a passive-matrix driven LED display, a case where, for example, gradations corresponding to 22 bits are set, and the LED driver 121 expresses the gradations corresponding to 22 bits with 16-bit gradations using thinned light emission will be described.

Figure 4:
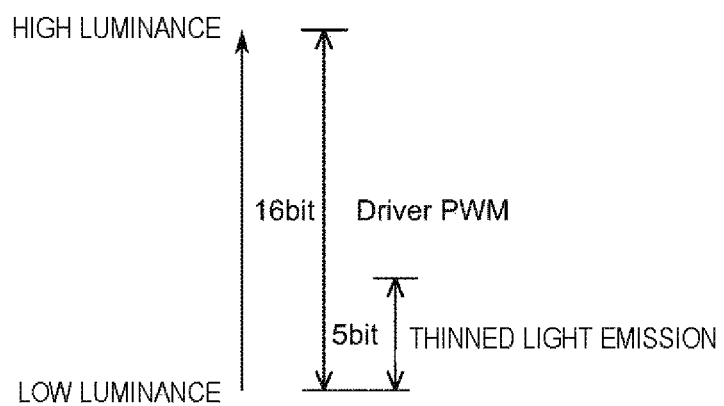
FIG. 4 is a diagram describing gradation expression using thinned light emission.

In this case, as depicted in FIG. 4, among the 16 bits, higher-order 11 bits corresponding to a high luminance side are set with a pulse width that is a length of one light emission time for each line to express gradations (Drive PWM), and moreover, the lower-order 5 bits are expressed with thinned light emission.

Figure 5:
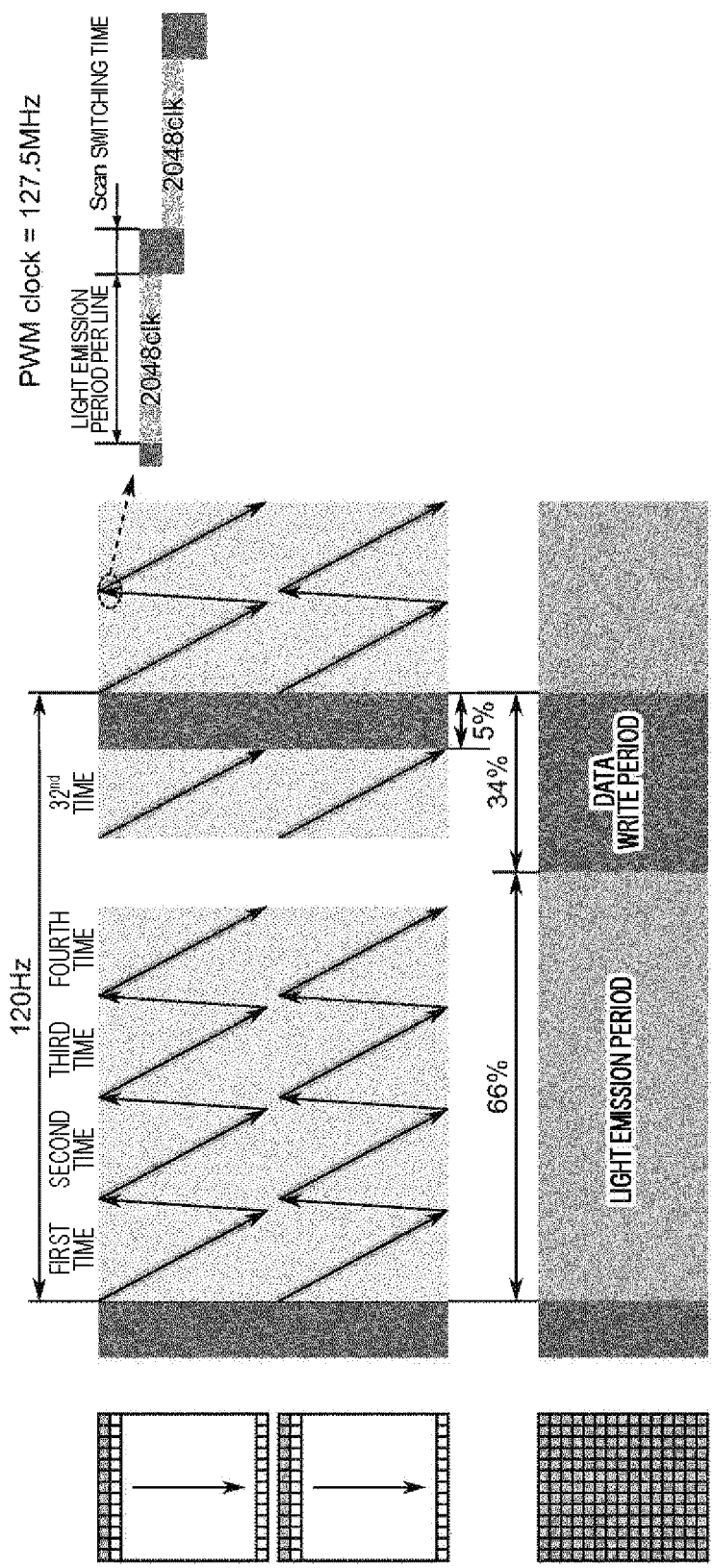
FIG. 5 is a diagram describing gradation expression using thinned light emission.

More specifically, in a case of a passive-matrix driven LED display, as depicted in the upper part of FIG. 5, for each light emission for one frame, a process of emitting light for one frame image by sequentially emitting light line by line from the top to the bottom in the drawing is repeated 32 times.

Note that, in the upper part of FIG. 5, right-downward arrows indicate the order in which light is sequentially emitted from the upper row to the lower row in time series, and right-upward arrows indicate switching from the last line to the first line for the next light emission.

That is, for the high luminance side, in a case where one cycle of the light emission period is 120 Hz, a process in which luminance is expressed by the length of the light emission time in units of the pulse width set by a maximum of 2048 ($=2^{11}$) clock expressed in 11 bits for each line of LEDs, and all lines are displayed is repeated 32 times during 120 Hz. Therefore, the refresh rate is 3840 (=120×32) Hz.

Furthermore, as depicted in an enlarged view of a portion surrounded by a dotted line in the upper right part of FIG. 5, a switching time for each line is set, and moreover, 5% of the refresh rate is set as a write period in which gradation data expressing luminance expressed in 11 bits is written. Note that, under the passive-matrix drive scheme, the write period can also be set during light emission and can be made shorter.

On the other hand, in a case of an active-matrix driven LED display, as depicted in the lower part of FIG. 5, 66% of 120 Hz, which is one cycle of the light emission period, is set as a light emission period during which all the LEDs (all the lines) simultaneously emit light, the remaining 34% period is set as the data write period, and during this period, the LEDs are in a light-off state.

On the other hand, the low luminance gradations corresponding to the lower-order 5 bits for the passive-matrix driven LED display are controlled in a manner different from the control on the high luminance side described above, and the lower-order 5 bits are expressed by performing control to reduce the number of times of light emission repeated 32 times.

That is, when the highest luminance is expressed, light emission is repeated 32 (=$2^5$) times, and when the lowest luminance is expressed, 31 is subtracted from the number of times of light emission repeated 32 times, and light emission is performed only one time.

Figure 6:
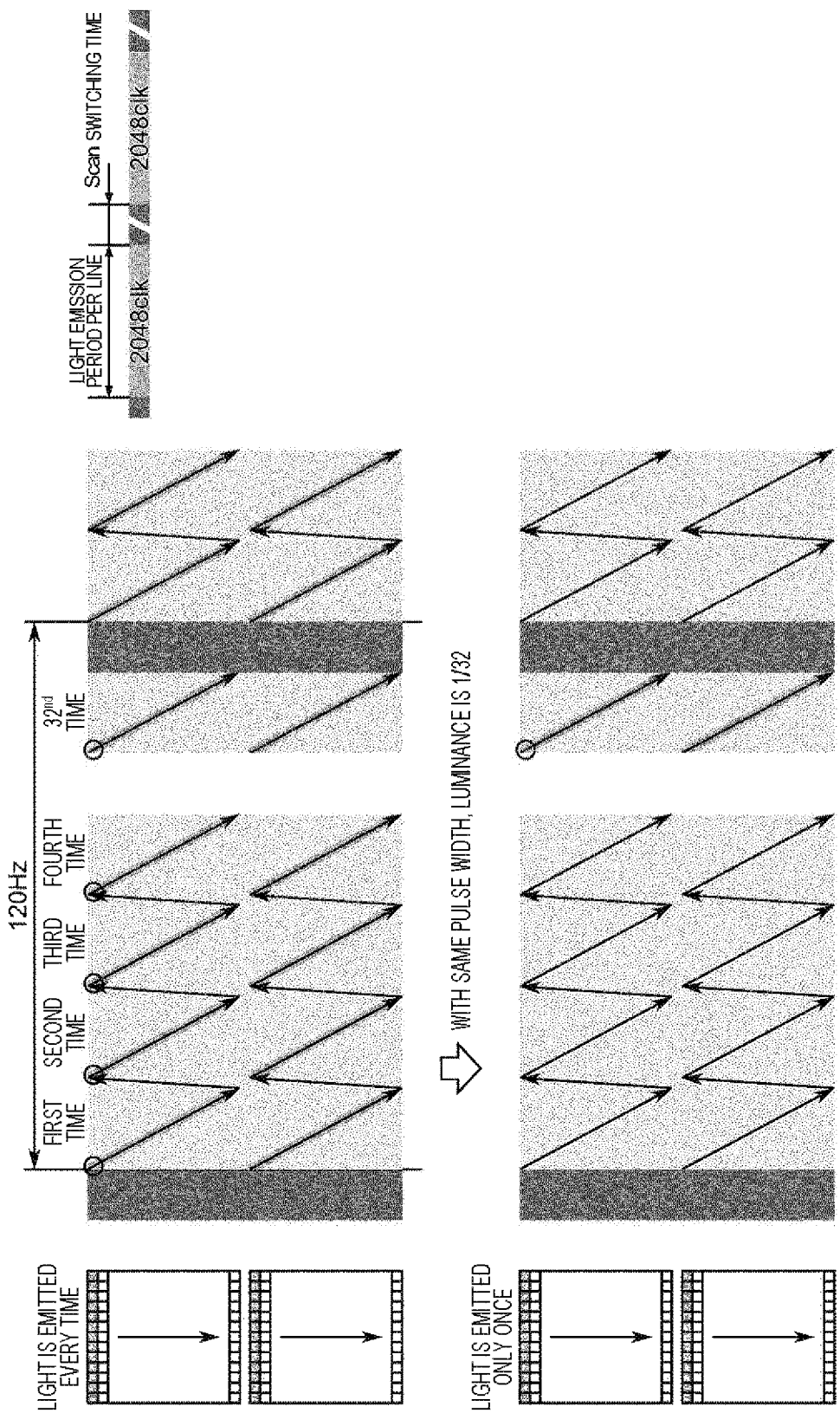
FIG. 6 is a diagram describing gradation expression using thinned light emission.

Therefore, in a case where light emission is performed only one time out of 32 times, for example, as indicated by a circled downward arrow in the lower part of FIG. 6, the lowest luminance is expressed by only one time of light emission, that is, only 32nd light emission, performed line by line from the top to the bottom, that is, by light emission performed only during a period of $\frac{1}{32}$ of 120 Hz that is one cycle.

Note that the upper part of FIG. 6 depicts, for comparison, an example of the gradation expression of the high luminance side corresponding to the higher-order 11 bits for which light emission is repeated 32 times.

Furthermore, as an example of a method for controlling a passive-matrix driven LED display, an example has been described above where LEDs arranged in the horizontal direction are sequentially controlled line by line in the vertical direction to emit light, or alternatively, LEDs arranged in the vertical direction may be sequentially controlled line by line in the horizontal direction to emit light.

5. Global Shutter and Rolling Shutter

Next, global shutter and rolling shutter will be described with reference to FIG. 7.

As an exposure method for an imaging device that captures an image displayed on an LED display, global shutter in which an exposure time and a readout time are set at the same timing for all pixels, and rolling shutter in which the exposure time and the read out time are sequentially set row by row.

Figure 7:
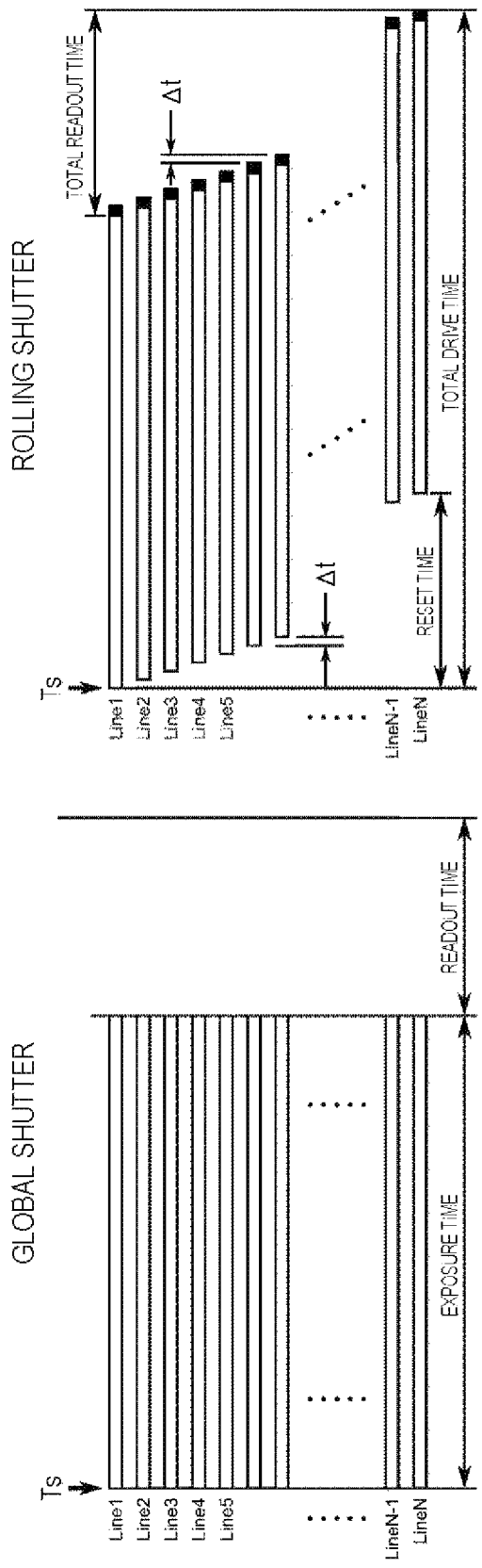
FIG. 7 is a diagram describing global shutter and rolling shutter.

More specifically, in the global shutter, for example, as depicted in the left part of FIG. 7, the exposure time (Exposure Time) from a readout start timing (Frame Start Triggered) Ts is set at the same timing for pixels of all lines from Line 1 to Line N, and then, the readout time (Readout Time) is set at the same timing for the pixels of all the lines from Line 1 to Line N.

On the other hand, for example, as depicted in the right part of FIG. 7, in the rolling shutter, when the exposure time (Exposure Time) of Line 1 is started at the readout start timing (Frame Start Triggered) Ts, the exposure time (Exposure Time) of Line 2 is started later by a predetermined time Δt, and the exposure time (Exposure Time) of Line 3 is started further later by the predetermined time Δt, . . . , and finally, the exposure time (Exposure Time) of Line N is started later by Δt (N−1).

Then, the readout time (Readout Time) is set at a timing when the exposure time (Exposure Time) of Line 1 ends, then, the readout time (Readout Time) of Line 2 is set later by the predetermined time Δt relative to the timing when the exposure time (Readout Time) of Line 1 ends, . . . , and finally, the readout time (Readout Time) of Line N is set later by Δt (N−1) (Reset Runtime) relative to the timing when the exposure time (Runtime Exposure Time) of Line 1 ends. Note that the readout time is represented by a black portion after the end of the exposure time of each line in the right part of FIG. 7.

As a result, in the rolling shutter, the total readout time (Total Readout Time) of Δt×N is set, but the readout time (Readout Time) is set for each line and is different in timing by Δt between lines adjacent to each other.

6. Cause of Banding

Figure 8:
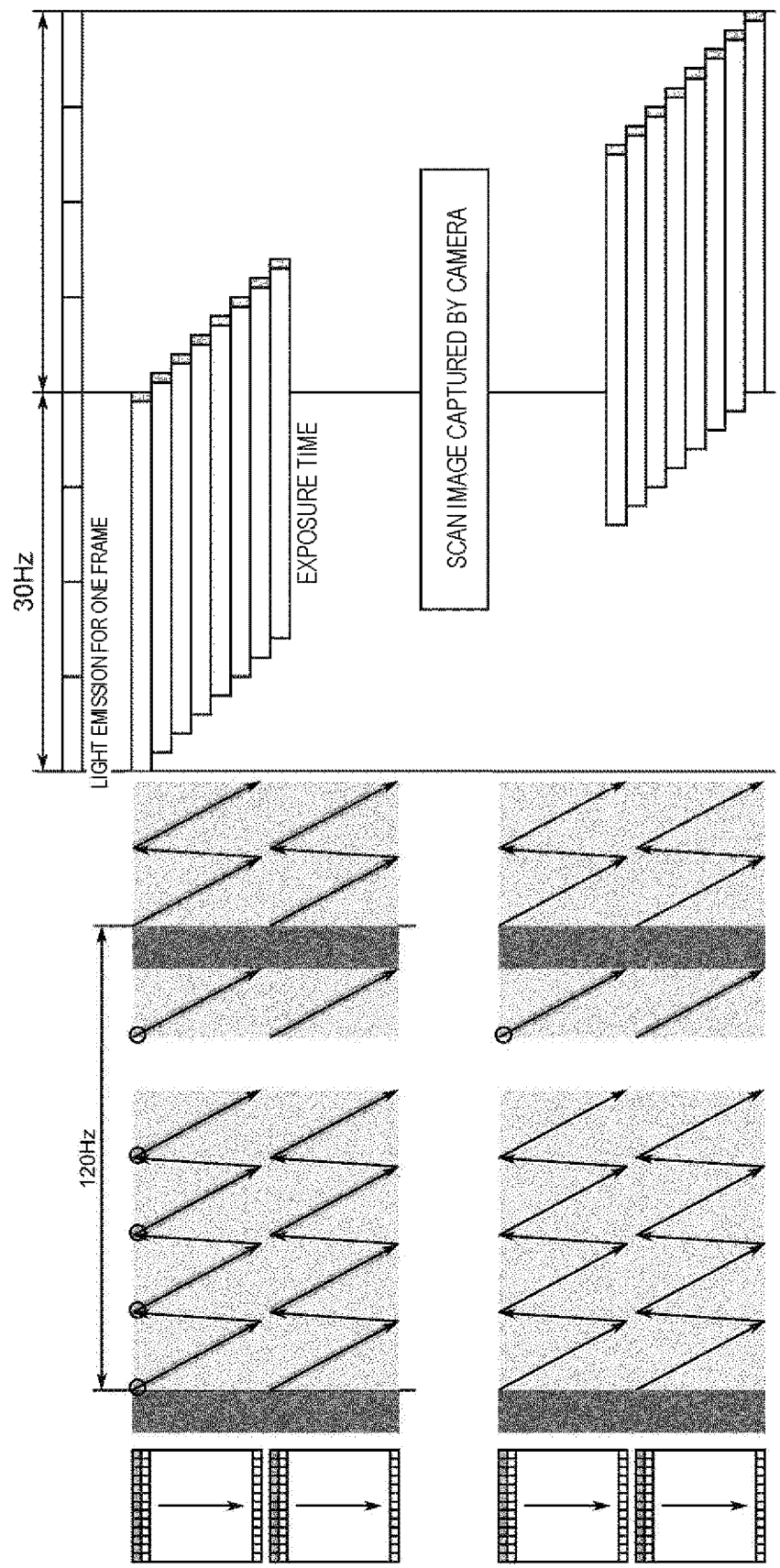
FIG. 8 is a diagram describing a cause of banding.

Therefore, for example, in a case where an image displayed on an LED display whose light emission is controlled under an active-matrix drive scheme is captured by an imaging device such as a camera, which is so-called re-imaging, is considered, as depicted in the upper left part of FIG. 8, during high luminance light emission, it is possible to perform light emission at a predetermined ratio between the exposure time and the readout time, thereby allowing appropriate imaging.

However, in a case where low luminance light emission is performed with thinned light emission, for example, as depicted in the lower left part of FIG. 8, for the lowest luminance, the light emission timing is $\frac{1}{32}$ of 120 Hz that is one cycle; therefore, if the light emission time of a predetermined line of the LED display overlaps with the readout time of any line on the imaging device side, the exposure time of the line that overlaps with the readout time is not set, and only the line becomes dark as compared with adjacent other lines.

As a result, as compared with the other lines, the line whose exposure time is not set appears in an image as a black linear band, which becomes banding.

7. Gradation Expression of Present Disclosure

Figure 9:
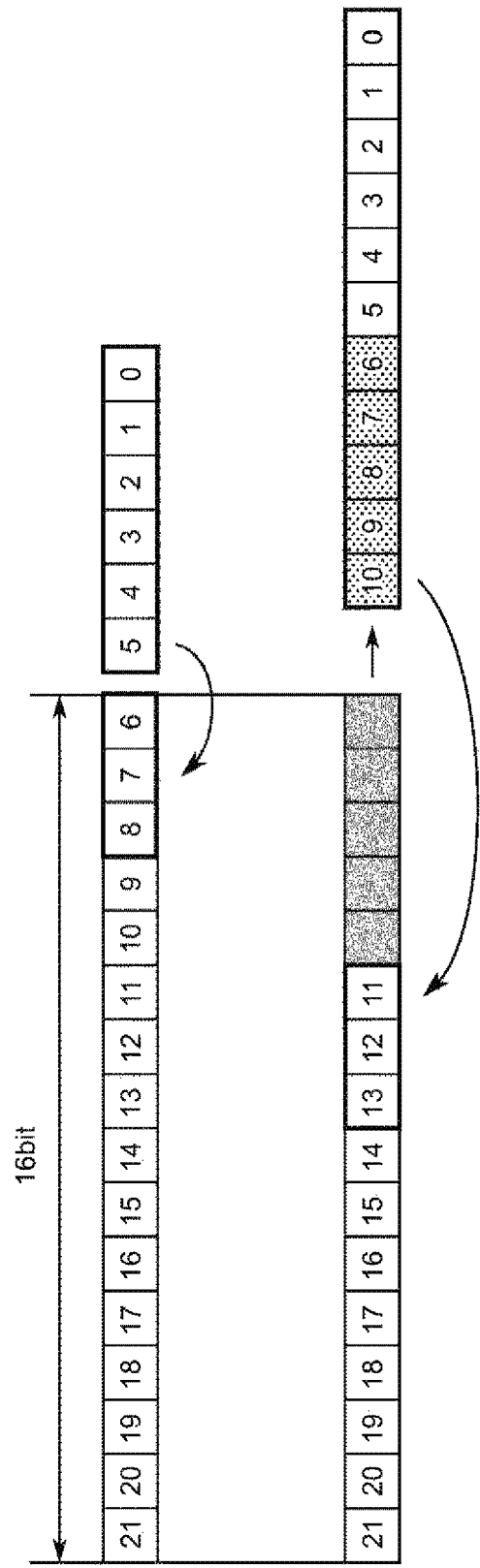
FIG. 9 is a diagram describing gradation expression of the present disclosure.

Then, in the present disclosure, in a case where re-imaging is not required, and measures against banding are not required accordingly, as depicted in the upper part of FIG. 9, 6 bits used for expression gradations are superimposed on the lower-order 3 bits of 16 bits that can be controlled by a driver, and gradations corresponding to 22 bits are expressed with thinned light emission using 16-bit gradations that can be controlled by the driver.

Furthermore, in a case where re-imaging is required, and measures against banding are required accordingly, the lower-order 5 bits used for the control with thinned light emission are fixed at 0, that is, the control with thinned light emission is disabled. Moreover, with pseudo gradations using a total of 3 bits of 11th to 13th lower bits, expression gradations corresponding to 11 bits obtained by combining 5 bits expressed with thinned light emission and 6 bits used for expression gradations are expressed in a superimposed manner.

Here, the pseudo gradations are not gradations expressed by each LED but gradations expressed by changing a light emission pattern or the like using each plurality of LEDs set as a unit.

8. Example of Pseudo Gradation

Figure 10:
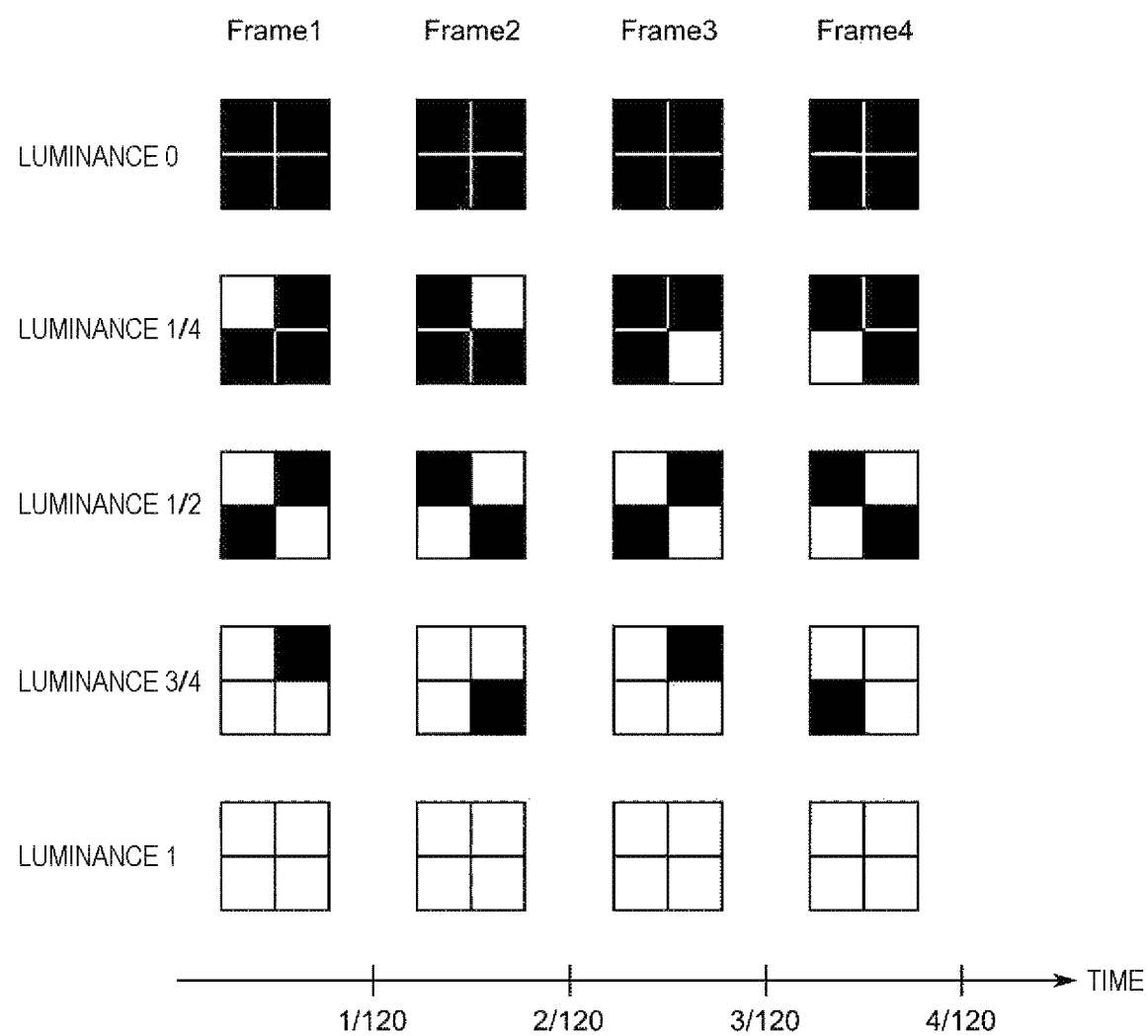
FIG. 10 is a diagram describing pseudo gradation.

For example, in a case where gradations are quadrupled using four LEDs of two adjacent LEDs×two adjacent LEDs (=the number of LEDs in the horizontal direction×the number of LEDs in the vertical direction), as depicted in FIG. 10, by controlling a light emission area, that is, by controlling, for each plurality of LEDs set as unit, the number of LEDs that emit light, luminance of 3/4, 2/4, 1/4, and 0 times the highest luminance depicted in the lowermost part of FIG. is expressed in order from the bottom.

Note that, at this time, when the same LEDs are caused to emit light, resolution looks lower, so that, as indicated by Frame 1, Frame 2, Frame 3, and Frame 4 in order from the left in the drawing, the positions of the LEDs that emit light for each frame are changed and repeatedly displayed. Note that the number of the plurality of LEDs set as a unit is not limited to four as in FIG. 10, and may be a number other than four.

As described above, the pseudo gradations are gradations expressed by light emitted from the plurality of LEDs set as a unit while changing the number of LEDs that emit light and the positions of the LEDs that emit light. In other words, the pseudo gradations correspond to a gradation expression method in which the number of gradations is increased in a pseudo manner without reducing the resolution by emitting light of LEDs while changing, per unit area, the number of LEDs that emit light and the positions of the LEDs that emit light.

As described above, for such a low luminance range, the light emission of LEDs is controlled using the pseudo gradations, so that the occurrence of a line in which when re-imaging is performed, the exposure time and the readout time overlap, and the exposure time disappears accordingly as in the control using thinned light emission is suppressed, and thus the occurrence of banding is suppressed even during re-imaging.

Furthermore, for example, whether or not the light emission control of LEDs using the pseudo gradations adapted to re-imaging is performed at low luminance may be set by switching, using a specific operation button provided in the video wall controller 32, between the light emission control using the pseudo gradations and the light emission control using the thinned light emission, or may be set in accordance with a command supplied from the PC 30.

Furthermore, an imaging device that captures an image of a surrounding area of the LED display, particularly, the front of the display surface of the LED display is separately provided, the image of the front of the display surface is captured, object recognition processing is performed on the captured image, and when an imaging device capable of capturing (re-imaging) an image displayed on the LED display is detected in the image, a setting may be made such that the light emission control of LEDs using the pseudo gradations adapted to re-imaging is performed at low luminance. Furthermore, for example, the detection of the imaging device may be performed on the basis of a signal transmitted from the imaging device to the display system 11 in a wireless or wired manner.

9. Display Processing

Figure 11:
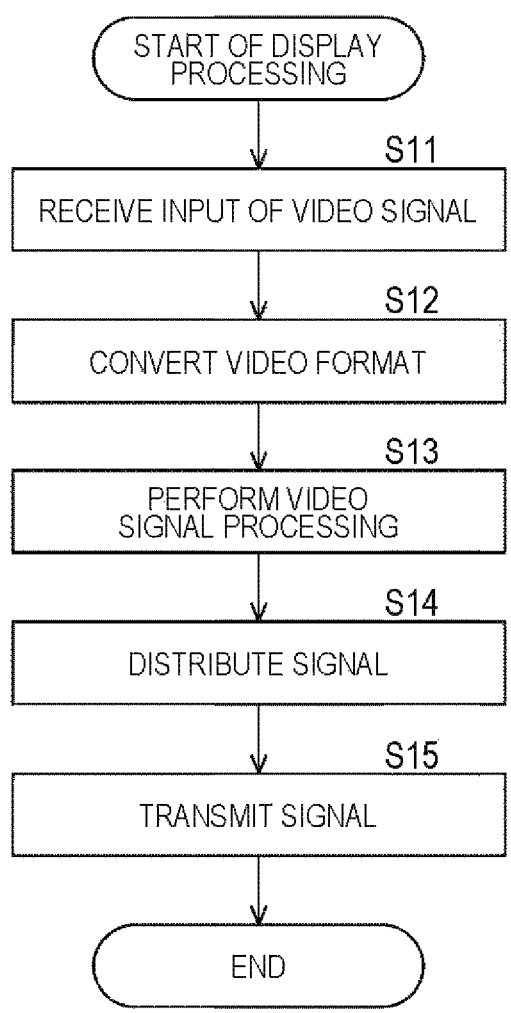
FIG. 11 is a flowchart describing display processing.

Next, display processing performed by the display system 11 in FIG. 1 will be described with reference to a flowchart in FIG. 11.

In step S11, the signal processing unit 78 receives the input of a video signal containing content data and the like supplied from the video server 31 via any one of the HDMI terminal 72, the DP terminal 73, or the DVI terminal 74, and the signal input IF 77.

In step 512, the signal processing unit 78 converts a video format of the received video signal.

In step 513, the signal processing unit 78 receives the input of a control signal supplied from the MPU 76, the control signal being supplied in accordance with a detail of an operation made on the PC 30, and performs signal processing for color temperature, contrast, brightness, and the like.

In step 514, the signal processing unit 78 allocates the video signal subjected to the signal processing to the display units 51-1 to 51-n of the video wall 33, and distributes the video signal among the display units 51-1 to 51-n.

In step 515, the signal processing unit 78 transmits the distributed video signal to each corresponding one of the display units 51-1 to 51-n to output the video signal.

Through the above series of processes, the video signal read from the video server 31 is subjected to the signal processing, distributed among the display units 51-1 to 51-n constituting the video wall 33, and transmitted so as to allow the display units 51-1 to 51-n to each display a corresponding image, thereby allowing the video wall 33 to display the entire image of the video content.

10. Driver Control Processing by Display Unit

Figure 12:
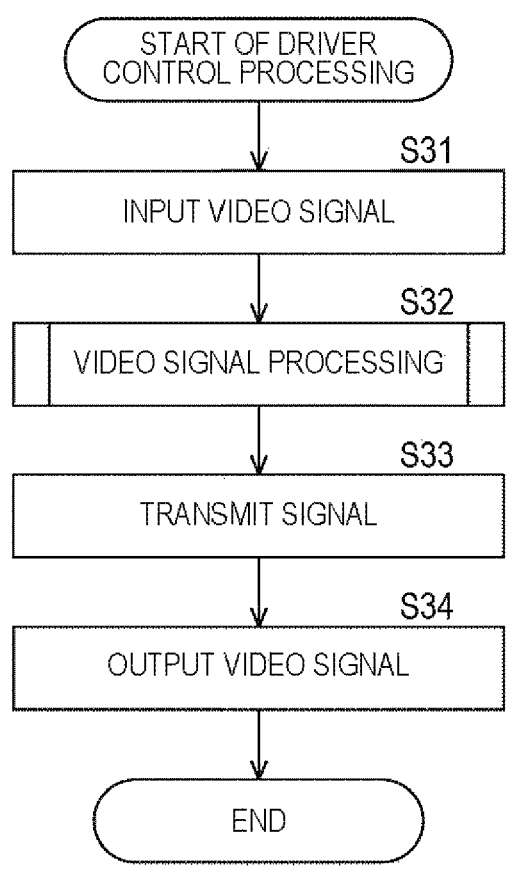
FIG. 12 is a flowchart describing driver control processing.

Next, driver control processing performed by the display unit 51 will be described with reference to a flowchart in FIG. 12.

In step S31, the signal processing unit 112 of the driver control unit 91 of the display unit 51 receives, for each row, the input of the video signal distributed by and supplied from the video wall controller 32 via the signal input IF 111.

Figure 13:
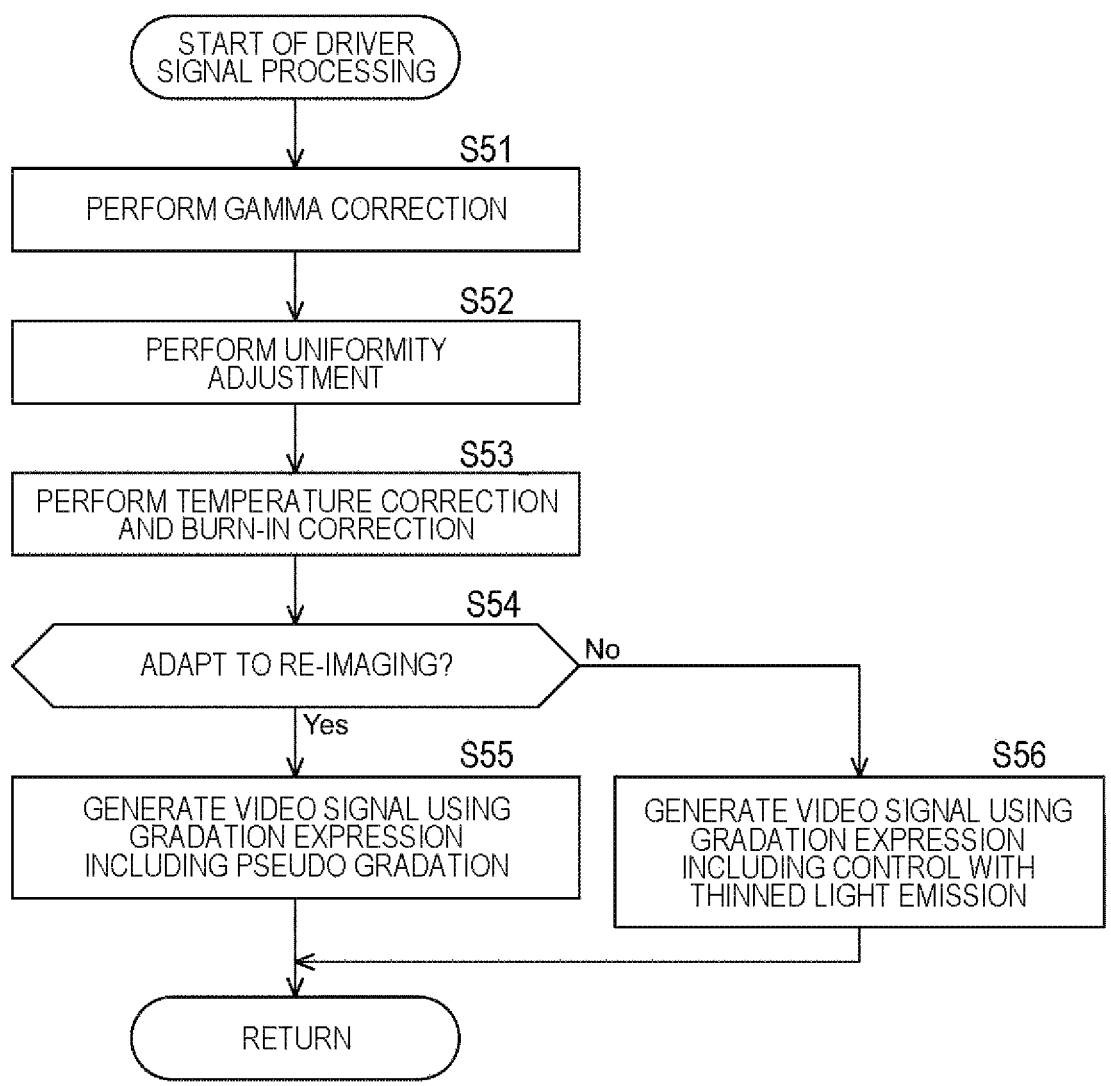
FIG. 13 is a flowchart describing driver signal processing.

In step S32, the signal processing unit 112 performs video signal processing of correcting color, luminance, and the like corresponding to each of the display units 51 on the video signal of each line distributed among the display units 51. Note that details of the video signal processing will be described later with reference to a flowchart in FIG. 13.

In step S33, the signal processing unit 112 allocates the video signal of each line subjected to the video signal processing to the LED drivers 121-1 to 121-N of the LED block 92, and transmits the video signal via a corresponding one of the output IFs 114-1 to 114-N.

In step 534, the LED drivers 121-1 to 121-N of the LED block 92 each perform an LED drive control process on the basis of the video signal of each line and cause a corresponding one of the LED arrays 122-1 to 122-N to display, under the PWM control, an image row by row with appropriate luminance.

Through the above processes, for each of the display units 51 constituting the video wall 33, the appropriate luminance adjustment is performed, and the video signal is output to the LED block 92, thereby allowing an image to be sequentially displayed row by row.

11. Video Signal Processing

Next, the video signal processing corresponding to the process in step S32 described above will be described.

In step S51, the signal processing unit 112 performs gamma correction on the video signal.

In step S52, the signal processing unit 112 performs a uniformity adjustment on the video signal subjected to the gamma correction to reduce color irregularity and luminance irregularity in the entire image.

In step S53, the signal processing unit 112 performs temperature correction and burn-in correction on the video signal subjected to the uniformity adjustment.

In step S54, the signal processing unit 112 determines whether or not to enable a mode in which measures are taken to suppress banding that occurs when an image displayed on the LED display is captured by an imaging device such as another camera, which is so-called re-imaging.

The mode may be enabled in advance by the user, or the determination may be made on the basis of, for example, whether or not it is under an environment where the image of the front of the display surface of the LED display is captured, the imaging device is installed, and re-imaging is performed.

In a case where it is determined in step S54 that the mode in which measures are taken to suppress banding that occurs during re-imaging is enabled, the processing proceeds to step S55.

In step S55, the signal processing unit 112 generates, on the basis of the video signal subjected to the temperature correction and the burn-in correction, a video signal using gradation expression including pseudo gradations achieved by controlling, for each plurality of LEDs set as a unit, the number of LEDs that emit light and the positions of the LEDs that emit light described above with reference to the lower part of FIG. 9 and FIG. 10.

On the other hand, in a case where it is determined in step S54 that the mode in which measures are taken to suppress banding that occurs during re-imaging is disabled, the processing proceeds to step S56.

In step S56, the signal processing unit 112 generates, on the basis of the video signal subjected to the temperature correction and the burn-in correction, a video signal using gradation expression including control with thinned light emission described above with reference to the upper part of FIG. 9.

In the above-described processes, in order to adapt to re-imaging, luminance is adjusted by adjusting the length of the light emission time for high luminance gradations expressed by the higher-order bits, and luminance is adjusted using the pseudo gradations for low luminance gradations expressed by the lower-order bits.

Therefore, when re-imaging is performed, the light emission control using thinned light emission is not performed, so that it is possible to suppress the occurrence of banding even at low luminance.

Note that the number of higher-order bits expressing high luminance gradations and the number of lower-order bits expressing low luminance gradations are not limited to the number of bits described above.

Furthermore, an example has been described above where the pseudo gradations are used only when measures for re-imaging are taken, or alternatively, the pseudo gradations may be always used regardless of whether or not re-imaging is to be performed.

Note that the present disclosure may also have the following configurations.

<1>

A drive control device including a light emission control unit configured to control light emission of light emitting diodes (LEDs) constituting an LED array, in which
the light emission control unit performs light emission control for each plurality of the LEDs set as a unit to express some gradations of luminance of the LEDs.

<2>

The drive control device described in <1>, in which
the light emission control unit controls the light emission of the LEDs constituting the LED array under a passive-matrix drive scheme by which the light emission is controlled scan line by scan line.

<3>

The drive control device described in <1> or <2>, in which
the light emission control unit performs the light emission control for each plurality of the LEDs set as a unit to express gradations of luminance lower than predetermined luminance of the LEDs.

<4>

The drive control device described in <3>, in which
the light emission control unit controls, for each plurality of the LEDs set as a unit, a pattern based on a number of the LEDs that emit light and positions of the LEDs to express the gradations of the luminance lower than the predetermined luminance of the LEDs.

<5>

The drive control device described in <4>, in which
the light emission control unit sequentially switches, in a same frame, patterns in which the number of the LEDs that emit light is identical, but the positions of the LEDs are different to express the luminance lower than the predetermined luminance of the LEDs.

<6>

The drive control device described in <1> or <2>, in which
in a case where a mode adapted to capture of an image displayed by the LED array is enabled, the light emission control unit performs the light emission control for each plurality of the LEDs set as a unit to express gradations of luminance lower than predetermined luminance of the LEDs.

<7>

The drive control device described in <6>, in which
in a case where the mode adapted to capture of an image displayed by the LED array is disabled, the light emission control unit performs control using thinned light emission in which light emission is performed with a number of times of repeated light emission in a same frame reduced to express the gradations of the luminance lower than the predetermined luminance of the LEDs.

<8>

The drive control device described in <1> or <2>, in which
in a case where an imaging device capable of capturing an image displayed by the LED array is detected, the light emission control unit performs the light emission control for each plurality of the LEDs set as a unit to express gradations of luminance lower than predetermined luminance of the LEDs.

<9>

The drive control device described in <8>, further including an imaging unit configured to capture an image of a surrounding area, in which
in a case where the imaging device is detected on the basis of the image of the surrounding area captured by the imaging unit or a signal emitted by the imaging device, the light emission control unit performs the light emission control for each plurality of the LEDs set as a unit to express the gradations of the luminance lower than the predetermined luminance of the LEDs.

<10>

A drive control method including a step of controlling light emission of light emitting diodes (LEDs) constituting an LED array, in which
in a process of the step, light emission control is performed for each plurality of the LEDs set as a unit to express some gradations of luminance of the LEDs.

<11>

The drive control method described in <10>, in which
in the process of the step, the light emission of the LEDs constituting the LED array is controlled under a passive-matrix drive scheme by which the light emission is controlled scan line by scan line.

<12>
The drive control method described in <10> or <11>, in which
in the process of the step, the light emission control is performed for each plurality of the LEDs set as a unit to express gradations of luminance lower than predetermined luminance of the LEDs.
<13>
The drive control method described in <12>, in which
in the process of the step, a pattern based on a number of the LEDs that emit light and positions of the LEDs is controlled for each plurality of the LEDs set as a unit to express the gradations of the luminance lower than the predetermined luminance of the LEDs.
<14>
The drive control method described in <13>, in which
in the process of the step, patterns in which the number of the LEDs that emit light is identical, but the positions of the LEDs are different are sequentially switched in a same frame to express the luminance lower than the predetermined luminance of the LEDs.
<15>
The drive control method described in <10> or <11>, in which
in the process of the step, in a case where a mode adapted to capture of an image displayed by the LED array is enabled, the light emission control is performed for each plurality of the LEDs set as a unit to express gradations of luminance lower than predetermined luminance of the LEDs.
<16>
The drive control method described in <15>, in which
in the process of the step, in a case where the mode adapted to capture of an image displayed by the LED array is disabled, control using thinned light emission in which light emission is performed with a number of times of repeated light emission in a same frame reduced is performed to express the gradations of the luminance lower than the predetermined luminance of the LEDs.
<17>
The drive control method described in <10> or <11>, in which
in the process of the step, in a case where an imaging device capable of capturing an image displayed by the LED array is detected, the light emission control is performed for each plurality of the LEDs set as a unit to express gradations of luminance lower than predetermined luminance of the LEDs.
<18>
The drive control method described in <17>, in which
in the process of the step, in a case where the imaging device is detected on the basis of an image of a surrounding area or a signal emitted by the imaging device, the light emission control is performed for each plurality of the LEDs set as a unit to express the gradations of the luminance lower than the predetermined luminance of the LEDs.
<19>
An information processing system including:
a display including display units, each of the display units including light emitting diodes (LEDs) arranged in an array and a drive control device configured to control driving of the LEDs; and
a distributor configured to receive input of a video signal, perform predetermined signal processing on the video signal, and distribute the video signal among the display units, in which
the drive control device includes
a light emission control unit configured to control light emission of the LEDs, and
the light emission control unit performs light emission control for each plurality of the LEDs set as a unit to express some gradations of luminance of the LEDs.
<20>
An information processing method for an information processing system, the information processing system including:
a display including display units, each of the display units including light emitting diodes (LEDs) arranged in an array and a drive control device configured to control driving of the LEDs; and
a distributor configured to receive input of a video signal, perform predetermined signal processing on the video signal, and distribute the video signal among the display units,
the information processing method including a step of controlling light emission of the LEDs by the drive control device, in which
in a process of the step, light emission control is performed for each plurality of the LEDs set as a unit to express some gradations of luminance of the LEDs.

REFERENCE SIGNS LIST

11 Display system
30 PC
31 Video server
32 Video wall controller
33 Video wall
51, 51-1 to 51-$n$ Display unit
78 Signal processing unit
91 Driver control unit
92 Driver block
112 Signal processing unit
121, 121-1 to 121-N Drive circuit
122 Pixel array
141 LED

The invention claimed is:
1. A drive control device comprising
circuitry configured to:
determine whether to control light emission of light emitting diodes (LEDs) constituting an LED array in a first mode or a second mode; and
perform light emission control of the LEDs in the determined mode, wherein the circuitry is configured to:
perform light emission control to reduce, from a predetermined number of times, a number of times of repeated light emission of LEDs in one frame to express a gradation of the luminance lower than a predetermined luminance of the LEDs in the first mode; and
perform light emission control for each plurality of the LEDs set as a unit to express a gradation of luminance lower than the predetermined luminance of the LEDs in the second mode,
wherein the circuitry is configured to
perform the light emission control on a basis of a first plurality of bits in bits indicating a gradation of luminance in the first mode; and perform the light emission control on a basis of a second plurality of bits in the bits indicating the gradation of luminance in the second mode, the second plurality of bits being different from the first plurality of bits.

2. The drive control device according to claim 1, wherein the circuitry is configured to control the light emission of the LEDs constituting the LED array under a passive-matrix drive scheme by which the light emission is controlled scan line by scan line.

3. The drive control device according to claim 1, wherein the circuitry is configured to control, for each plurality of the LEDs set as a unit, a pattern based on a number of the LEDs that emit light and positions of the LEDs to express the gradations of the luminance lower than the predetermined luminance of the LEDs in the second mode.

4. The drive control device according to claim 3, wherein the circuitry is configured to switch, in sequential frames, patterns in which the number of the LEDs that emit light is identical and the positions of the LEDs are different to express the luminance lower than the predetermined luminance of the LEDs in the second mode.

5. The drive control device according to claim 1, wherein the second mode is a mode adapted to capture of an image displayed by the LED array.

6. The drive control device according to claim 1, wherein in a case where an imaging device capable of capturing an image displayed by the LED array is detected, the circuitry is configured to perform the light emission control for each plurality of the LEDs set as a unit in the second mode.

7. The drive control device according to claim 6, wherein the circuitry is further configured to:
control detection of the imaging device on a basis of an image of a surrounding area captured by an imaging unit or a signal emitted by the imaging device; and
perform, in a case where the imaging device is detected, the light emission control for each plurality of the LEDs set as a unit in the second mode.

8. A drive control method comprising:
determining whether to control light emission of light emitting diodes (LEDs) constituting an LED array in a first mode or a second mode; and
performing light emission control of the LEDs in the determined mode, so as to
perform light emission control to reduce, from a predetermined number of times, a number of times of repeated light emission of LEDs in one frame to express a gradation of the luminance lower than a predetermined luminance of the LEDs in the first mode; and
perform light emission control for each plurality of the LEDs set as a unit to express a gradation of luminance lower than the predetermined luminance of the LEDs in the second mode,
wherein in a case where an imaging device capable of capturing an image displayed by the LED array is detected, the light emission control is performed for each plurality of the LEDs set as a unit in the second mode, and
wherein the method comprises:
controlling detection of the imaging device on a basis of an image of a surrounding area captured by an imaging unit or a signal emitted by the imaging device; and
performing, in a case where the imaging device is detected, the light emission control for each plurality of the LEDs set as a unit in the second mode.

9. The drive control method according to claim 8, wherein the light emission of the LEDs constituting the LED array is controlled under a passive-matrix drive scheme by which the light emission is controlled scan line by scan line.

10. The drive control method according to claim 8, wherein the method comprises:
performing the light emission control on a basis of a first plurality of bits in bits indicating a gradation of luminance in the first mode; and
performing the light emission control on a basis of a second plurality of bits in the bits indicating the gradation of luminance in the second mode, the second plurality of bits being different from the first plurality of bits.

11. The drive control method according to claim 8, wherein
a pattern based on a number of the LEDs that emit light and positions of the LEDs is controlled for each plurality of the LEDs set as a unit to express the gradations of the luminance lower than the predetermined luminance of the LEDs in the second mode.

12. The drive control method according to claim 11, wherein the method comprises:
switching, in sequential frames, patterns in which the number of the LEDs that emit light is identical and the positions of the LEDs are different are sequentially switched in a same frame to express the luminance lower than the predetermined luminance of the LEDs in the second mode.

13. The drive control method according to claim 8, wherein
the second mode is a mode adapted to capture of an image displayed by the LED array.

14. An information processing system comprising:
a display including display units, each of the display units including light emitting diodes (LEDs) arranged in an array and a driver controller configured to control driving of the LEDs; and
a display controller configured to receive input of a video signal, perform predetermined signal processing on the video signal, and distribute the video signal among the display units, wherein
the driver controller includes circuitry configured to:
determine whether to control light emission of light emitting diodes (LEDs) constituting an LED array in a first mode or a second mode; and
perform light emission control of the LEDs in the determined mode, wherein the circuitry is configured to:
perform light emission control to reduce, from a predetermined number of times, a number of times of repeated light emission of LEDs in one frame to express a gradation of the luminance lower than a predetermined luminance of the LEDs in the first mode; and
perform light emission control for each plurality of the LEDs set as a unit to express a gradation of luminance lower than the predetermined luminance of the LEDs in the second mode,
wherein the circuitry is configured to
perform the light emission control on a basis of a first plurality of bits in bits indicating a gradation of luminance in the first mode; and perform the light emission control on a basis of a second plurality of bits in the bits indicating the gradation of luminance in the second mode, the second plurality of bits being different from the first plurality of bits.

15. An information processing method for an information processing system, the information processing system including:
- a display including display units, each of the display units including light emitting diodes (LEDs) arranged in an array and a driver controller configured to control driving of the LEDs; and
- a display controller configured to receive input of a video signal, perform predetermined signal processing on the video signal, and distribute the video signal among the display units, the information processing method comprising:
- determining whether to control light emission of light emitting diodes (LEDs) constituting an LED array in a first mode or a second mode; and
- performing light emission control, by the driver controller, of the LEDs in the determined mode, so as to perform light emission control to reduce, from a predetermined number of times, a number of times of repeated light emission of LEDs in one frame to express a gradation of the luminance lower than a predetermined luminance of the LEDs in the first mode; and
- perform light emission control for each plurality of the LEDs set as a unit to express a gradation of luminance lower than the predetermined luminance of the LEDs in the second mode, wherein in a case where an imaging device capable of capturing an image displayed by the LED array is detected, the light emission control is performed for each plurality of the LEDs set as a unit in the second mode, and wherein the method comprises:
- controlling detection of the imaging device on a basis of an image of a surrounding area captured by an imaging unit or a signal emitted by the imaging device; and
- performing, in a case where the imaging device is detected, the light emission control for each plurality of the LEDs set as a unit in the second mode.

* * * * *